United States Patent [19]

Nakamura

[11] Patent Number: 5,130,393
[45] Date of Patent: Jul. 14, 1992

[54] PLASTIC LENS

[75] Inventor: Shigeo Nakamura, Fussa, Japan

[73] Assignee: Hoya Corporation, Tokyo, Japan

[21] Appl. No.: 439,369

[22] PCT Filed: Mar. 31, 1989

[86] PCT No.: PCT/JP89/00345
§ 371 Date: Nov. 8, 1989
§ 102(e) Date: Nov. 8, 1989

[87] PCT Pub. No.: WO89/09418
PCT Pub. Date: Oct. 5, 1989

[30] Foreign Application Priority Data

Mar. 31, 1988 [JP] Japan .................................. 63-80126

[51] Int. Cl.$^5$ .............................................. C08F 18/24
[52] U.S. Cl. ...................................... 526/314; 526/318;
526/318.1; 526/318.4; 526/318.43; 526/318.44;
526/322; 526/326; 526/329.5; 526/329.7;
526/347
[58] Field of Search ............... 526/314, 347, 318, 322,
526/326, 329.5, 318

[56] References Cited

FOREIGN PATENT DOCUMENTS 51-125487 11/1976 Japan .
54-41965 4/1979 Japan .

Primary Examiner—Joseph L. Schofer
Assistant Examiner—Fred Zitomer
Attorney, Agent, or Firm—Nixon & Vanderhye

[57] ABSTRACT

The plastic lens of the present invention consists of a copolymer obtained by copolymerizing a monomer mixture consisting of given proportions of diethylene glycol bis(allyl carbonate), benzyl methacrylate, diallyl phthalate (these three monomers has been used as a monomer mixture for conventional plastic lenses) and, as an additional monomer, an alkyl methacrylate. This copolymer has excellent adhesion to upper and lower molds and, when immersed in, for example, a cleaning solution such as a methylene chloride-strong alkali mixed cleaning solution or the like, causes no separation from the molds; accordingly in the copolymer, there can be prevented the occurrence of surface roughening, cloudiness and striae which have been problems in conventional plastic lenses.

4 Claims, No Drawings

PLASTIC LENS

TECHNICAL FIELD

The present invention relates to a plastic lens and particularly to a high refractive index plastic lens suitable for use as an ophthalmic lens.

BACKGROUND ART

Ophthalmic plastic lenses have conventionally been produced by casting diethylene glycol bis(allyl carbonate) (DEGBAC) monomer or methyl methacrylate (MMA) monomer into a mold or the like and polymerizing one of these monomers. These plastic lenses, as compared with conventional inorganic glass lenses (crown glass lenses), are superior in lightweightness, safety and tintability. These plastic lenses, however, have a refractive index ($n_D$) of about 1.50 which is lower than the refractive index ($n_D$) of conventional inorganic glass lenses, i.e. 1.523; accordingly, the plastic lenses have a drawback in that their center thickness and edge thickness must be made large. In order to eliminate such a drawback, it is desired to develop a plastic lens of high refractive index.

As a method for increasing the refractive index of plastic lens, there is known a method comprising copolymerizing a monomer mixture obtained by adding to a conventional monomer (e.g. DEGBAC), another monomer which allows the resulting polymer to have a high refractive index. The high refractive index plastic lens thus obtained is required to not only have a high refractive index but also have good physical and chemical properties as an ophthalmic lens and further good moldability. As a plastic lens satisfying these requirements, there is mentioned a plastic lens consisting of a terpolymer obtained by polymerizing diethylene glycol bis(allyl carbonate) (DEGBAC), diallyl phthalate (DAP) and benzyl metahcrylate (BzMA), described in, for example, Japanese Patent Application Kokai (Laid-Open) No. 212401/1982. Said plastic lens is obtained by casting a monomer mixture of DEGBAC, DAP and BzMA into a mold assembly constituted by glass or metal upper and lower molds and a resin gasket, polymerizing and curing the mixture by means of heating, ultraviolet irradiation or the like, and releasing the resulting polymer from the molds.

The copolymer produced according to the above prior art method has a high refractive index ($n_D$=about 1.55), good physical and chemical properties and good moldability. However, in its production, when the monomer mixture is casted into the mold assembly constituted by upper and lower molds and a gasket, the monomer mixture easily adheres to the outer surfaces of the molds; if the heat curing is effected with the outer surfaces left in such a state, the monomer mixture adhering to the molds is heated and resultantly the mold outer surfaces become stained with a half-cured viscous liquid adhering thereto. If, under this condition of the stained outer surfaces of the molds, there is effected an operation for releasing the formed plastic lens from the molds, there occurs the adhesion of said viscous liquid to the plastic lens, when the plastic lens is contacted with the mold outer surfaces, thereby causing the staining and, cloudiness and of the lens.

In order to solve these problems, there is currently being adopted a method comprising cleaning stained molds with, for example, a methylene chloride-strong alkali mixed cleaning solution and then releasing a plastic lens from the molds.

However, the DEGBAC-DAP-BzMA copolymer has weak adhesion to the molds even when no releasing agent such as silicon, fluorine or other type releasing agent is used, and therefore the copolymer has the following drawback. That is, when the mold assembly constituted by upper and lower molds and a gasket is disassembled to remove only the gasket and the molds and the copolymer existing therebetween are immersed in the above mentioned methylene chloride-strong alkali mixed cleaning solution, separation occurs between the molds and the copolymer, whereby the cleaning solution penetrates into the molds, easily inviting the surface roughening, and cloudiness and of the plastic lens caused by the above mentioned cleaning solution.

Hence, the object of the present invention is to provide a high refractive index plastic lens which has improved adhesion to molds, consequently causes no separation from the molds even when immersed in the above mentioned cleaning solution and invites no surface roughening, and no cloudiness.

DISCLOSURE OF THE INVENTION

The above object has been achieved by a plastic lens consisting of a copolymer obtained by copolymerizing a monomer mixture comprising (A) 5-40% by weight of diethylene glycol bis(allyl carbonate) (DEGBAC), (B) 5-40% by weight of benzyl methacrylate (BzMA), (C) 14-88% by weight of diallyl phthalate (DAP) and (D) 2-6% by weight of a $C_{1-4}$alkyl methacrylate (AMA).

This plastic lens has a high refractive index of, for example, $n_D$=1.54 or more and is suitable for use as an ophthalmic lens.

BEST MODE FOR CARRYING OUT THE INVENTION

In the plastic lens of the present invention, it is essential that each monomer constituting the plastic lens be in a given amount range. That is, the amount range of diethylene glycol bis(allyl carbonate) (DEGBAC) which is the component (A), is 5-40% by weight. The reasons are as follows. When the amount is more than 40% by weight, although the resulting lens has improved physical and chemical properties in, for example, mar resistance, impact resistance, solvent resistance and weather resistance, the lens has a refractive index ($n_D$) of 1.54 or less, possesses cloudiness and striae, and is undesirable as an ophthalmic lens. When the amount is less than 5% by weight, the resulting lens has inferior physical and chemical properties and reduced moldability and poses problems in practical application. The amount range of benzyl methacrylate (BzMA) which is the component (B), is 5-40% by weight. The reasons are as follows. When the amount is more than 40% by weight, the resulting lens has cloudiness and striae and its moldability is very inferior. When the amount is less than 5% by weight, the lens has yellowing. The diallyl phthalate (DAP) which is the component (C) may be diallyl isophthalate (DAIP), diallyl terephthalate (DATP) or their mixture. The amount range of this DAP is 14-88% by weight. The reasons are as follows. When the amount is more than 88% by weight, the resulting lens has inferior physical and chemical properties and inferior moldability. When the amount is less than 14% by weight, the lens has a reduced refractive index, cloudiness, striae and inferior moldability. As the $C_{1-4}$alkyl methacrylate (AMA) which is the component (D), there is used at least one member selected from the group consisting of methyl methacrylate, ethyl methacrylate, propyl methacrylate and butyl methacrylate. The propyl methacrylate includes n-propyl methacrylate and i-propyl methacrylate, and the butyl methacrylate includes n-butyl methacrylate, i-butyl methacrylate and t-butyl methacrylate. The amount range of AMA is 2–6% by weight. The reasons are as follows. When the amount is more than 6% by weight, the resulting copolymer has too strong adhesion to molds, making difficult its release from the molds; and the copolymer has reduced tintability. When the amount is less than 2% by weight, the resulting copolymer has weak adhesion to the molds; when the molds are immersed in a cleaning solution such as a methylene chloride-strong alkali mixed cleaning solution or the like, separation easily takes place between the molds and the copolymer; as a result, as mentioned previously, the copolymer is attacked by the cleaning solution and there appears surface roughening on the surface of the plastic lens. When no component (D) is used and there are used the component (A), the component (B), the component (C) and another monomer other than the component (D), separation also takes place easily between the molds and the resulting copolymer; the copolymer has cloudiness and striae; thus, the object of the present invention cannot be achieved.

The plastic lens of the present invention can be obtained by mixing the component (A), the component (B), the component (C) and the component (D) so that each component is in the above mentioned weight range, adding a polymerization initiator thereto, casting the resulting mixture into a mold assembly constituted by glass upper and lower molds and a resin gasket, and polymerizing and curing the mixture by means of heating, ultraviolet irradiation or the like. It is also possible to add to the above monomer mixture not only a polymerization initiator but also an ultraviolet absorber and then effecting polymerization in the same manner as above. As the polymerization initiator, there can be used various known compounds, but it is appropriately selected so as to meet desired reaction conditions (e.g. temperature, time). Suitable compounds are, for example, 1,1-azobiscyclohexanecarbonate, diisopropyl peroxycarbonate, 1,1'-azobiscyclohexanenitrate and di-tert-butyl peroxide. As the ultraviolet absorber, there can be used various known compounds. Suitable compounds are, for exmaple, 2,2'-dihydroxy-4-methoxybenzophenone and 2-(2'-hydroxy-5'-tert-octylphenyl)benzotriazole.

The plastic lens of the present invention consists of a copolymer obtained by copolymerizing a monomer mixture consisting of given amount ranges of diethylene glycol bis(allyl carbonate) (DEGBAC), benzyl methacrylate (BzMA), diallyl phthalate (DAP) (these three monomers have been used as a monomer mixture for conventional plastic lenses) and an alkyl methacrylate (AMA). This coplymer has excellent adhesion to molds and, even when immersed in a cleaning solution, for example, a methylene chloride-strong alkali mixed cleaning solution, causes no separation from the molds. Accordingly, in this copolymer, there can be prevented the occurrences of surface roughening, cloudiness and striae which have been problems in conventional DEGBAC-BzMA-DAP type plastic lenses.

The present invention is explained in more detail below by way of Examples. However, the present invention is in no way restricted to these Examples. In the Examples, "parts" refer to "parts by weight" unless otherwise specified.

EXAMPLE 1

To starting monomers, i.e. 30 parts of diethylene glycol bis(allyl carbonate) (DEGBAC) (the component (A)), 20 parts of benzyl methacrylate (BzMA) [the component (B)), 45 parts of diallyl isophthalate (DAIP) (the component (C)) and 5 parts of methyl methacrylate (MMA) (the component (D)) was added 3 parts of diisopropyl peroxycarbonate as a polymerization initiator to prepare a monomer mixture. No releasing agent was added to this monomer mixture. Then, the mixture was casted into a mold assembly consisting of glass upper and lower molds and a resin gasket. At that time, the monomer mixture adhered to the outer surfaces of the molds. Thereafter, the mixture was heated by elevating its temperature from 40° C. to 90° C. in 24 hours to polymerize the monomers. As a result of this polymerization procedure, the monomer mixture adhering to the outer surfaces of the molds caused partial polymerization and became a viscous liquid. After the heating and polymerization, the gasket was removed and the molds and the copolymer were immersed in a methylene chloride-alkali mixed cleaning solution to remove the viscous liquid adhering to the outer surfaces of the molds. Since the resulting copolymer had good adhesion to the molds, there occurred no separation of the copolymer from the molds and accordingly there was no penetration of the cleaning solution into between the molds and the copolymer. Then, the plastic lens consisting of a cured quadripolymer was taken out from the molds and subjected to heat treatment at 120° C. for 1 hour.

The plastic lens obtained had a refractive index ($n_D$) of 1.549, a transmittance of 91% and gave no cloudiness, no surface roughening and no striae, as shown in Table 1B, and was suitable as a plastic lens. The physical properties such as surface hardness, tintability and the like of the plastic lens were about equivalent to those of a plastic lens (CR-39) consisting of a homopolymer of DEGBAC and were satisfatory.

EXAMPLES 2–11

Plastic lenses were prepared in the same manner as in Example 1 except that in each of Examples 2–11, the proportions of DEGBAC [the component (A)], BzMA [the component (B)], DAP (DAIP or DATP) [the component (C)] and AMA (MMA or n-BuMA (n-butyl methacrylate)] [the component (D)] were varied within the ranges specified by the present invention as shown in Table 1A. The physical properties of the plastic lenses obtained are shown in Table 1B.

The plastic lenses of Examples 2–11 also gave results at least equivalent to those of the plastic lens of Example 1.

COMPARATIVE EXAMPLES 1–10

Plastic lenses were prepared in the same manner as in Example 1 except that in each Comparative Example, the proportions of DEGBAC [the component (A)], BzMA [the component (B)], DAP (DAIP or DATP) [the component (C)] and AMA (MMA) [the component (D)] were varied outside the ranges specified by the present invention as shown in Table 2A. The physical properties of the plastic lenses obtained are shown in Table 2B.

The plastic lenses of Comparative Examples 1–10 had surface roughening, cloudiness and striae, and were significantly inferior to the plastic lenses of the present invention.

Refractive index: Measured by an Abbe's refractometer manufactured by Atago Co.

TABLE 1A

| | Composition (parts by weight) | | | | |
|---|---|---|---|---|---|
| | Component (A) | Component (B) | Component (C) | | |
| | Diethylene glycol bis(allyl carbonate) (DEGBAC) | Benzyl methacrylate (BzMA) | Diallyl isophthalate (DAIP) | Diallyl terephthalate (DATP) | Component (D) |
| Example 1 | 30 | 20 | 45 | 0 | 5 (MMA) |
| 2 | 40 | 40 | 14 | 0 | 6 (MMA) |
| 3 | 20 | 20 | 56 | 0 | 4 (MMA) |
| 4 | 10 | 20 | 67 | 0 | 3 (MMA) |
| 5 | 5 | 5 | 88 | 0 | 2 (MMA) |
| 6 | 30 | 20 | 0 | 45 | 5 (MMA) |
| 7 | 40 | 40 | 0 | 14 | 6 (MMA) |
| 8 | 20 | 20 | 0 | 56 | 4 (MMA) |
| 9 | 10 | 20 | 0 | 67 | 3 (MMA) |
| 10 | 5 | 5 | 0 | 88 | 2 (MMA) |
| 11 | 30 | 20 | 45 | 0 | 5 (n-BuMA) |

Note
MMA: Methyl methacrylate
n-BuMA: n-Butyl methacrylate

TABLE 1B

| | Refractive index ($n_D$) | Transmittance (%) | Cloudiness | Striae | Surface roughening | Separation |
|---|---|---|---|---|---|---|
| Example 1 | 1.549 | 91 | A | None | A | None |
| 2 | 1.544 | 90 | A | None | A | None |
| 3 | 1.557 | 90 | A | None | A | None |
| 4 | 1.564 | 91 | A | None | A | None |
| 5 | 1.566 | 90 | B | None | A | None |
| 6 | 1.549 | 90 | A | None | A | None |
| 7 | 1.544 | 90 | A | None | A | None |
| 8 | 1.557 | 91 | A | None | A | None |
| 9 | 1.564 | 91 | A | None | A | None |
| 10 | 1.566 | 91 | B | None | A | None |
| 11 | 1.549 | 91 | A | None | A | None |

TABLE 2A

| | Composition (parts by weight) | | | | |
|---|---|---|---|---|---|
| | Component (A) | Component (B) | Component (C) | | |
| | Diethylene glycol bis(allyl carbonate) (DEGBAC) | Benzyl methacrylate (BzMA) | Diallyl isophthalate (DAIP) | Diallyl terephthalate (DATP) | Component (D) |
| Comparative 1 | 30 | 20 | 50 | 0 | 0 |
| Example 2 | 70 | 5 | 25 | 0 | 0 |
| 3 | 25 | 5 | 70 | 0 | 0 |
| 4 | 5 | 10 | 84 | 0 | 1 (MMA) |
| 5 | 40 | 38 | 15 | 0 | 7 (MMA) |
| 6 | 30 | 20 | 0 | 49 | 1 (MMA) |
| 7 | 70 | 5 | 0 | 25 | 0 |
| 8 | 25 | 5 | 0 | 70 | 0 |
| 9 | 5 | 10 | 0 | 84 | 1 (MMA) |
| 10 | 40 | 38 | 0 | 15 | 7 (MMA) |

Note MMA: Methyl methacrylate

TABLE 2B

| | Refractive index ($n_D$) | Transmittance (%) | Cloudiness | Striae | Surface roughening | Separation |
|---|---|---|---|---|---|---|
| Comparative 1 | 1.551 | 91 | B | None | B | Observed |
| Example 2 | 1.520 | 91 | B | Observed | C | Observed |
| 3 | 1.554 | 90 | B | None | C | Observed |
| 4 | 1.568 | 90 | B | None | C | Observed |
| 5 | 1.543 | 90 | B | Observed | B | Observed |
| 6 | 1.552 | 91 | B | None | B | Observed |
| 7 | 1.520 | 90 | B | Observed | C | Observed |
| 8 | 1.552 | 90 | B | None | C | Observed |
| 9 | 1.566 | 91 | B | None | C | Observed |
| 10 | 1.543 | 90 | B | Observed | B | Observed |

The evaluation methods for the physical properties shown in Table 1B and Table 2B are shown below.

Transmittance: Measured by a spectrophotometer manufactured by Hitachi, Ltd.

Cloudiness: Examined visually under a fluorescent lamp.
 A: Substantially no cloudiness is observed.
 B: Slight cloudiness is observed.
 C: Considerable cloudiness is observed.
Striae: Examined by a strain meter.
Surface roughening: Examined visually under a fluorescent lamp.
 A: Substantially no surface roughening is observed.
 B: Slight surface roughening is observed.
 C: Considerable surface roughening is observed.
Separation: Examined visually.

As described in detail above, the plastic lens of the present invention, retaining the excellent physical and chemical properties and excellent moldability possessed by conventional high refractive index plastic lenses, eliminates the surface roughening, cloudiness and striae which are drawbacks of said conventional high refractive index plastic lenses. Accordingly, it is suitable for use as, for example, an ophthalmic lens.

I claim:
1. An ophthalmic lens having an index of refraction of at least 1.54 obtained by polymerizing a monomer mixture consisting essentially of:
 A. 5 to 40% by weight of diethylene glycol bis(allyl carbonate),
 B. 5 to 40% by weight of benzyl methacrylate,
 C. 14 to 88% by weight of diallyl phthalate, and
 D. 2 to 6% by weight of a $C_{1-4}$ alkyl methacrylate.
2. A plastic lens according to claim 1, wherein the alkyl methacrylate is at least one member selected from the group consisting of methyl methacrylate, ethyl methacrylate, n-propyl methacrylate and n-butyl methacrylate.
3. A plastic lens according to claim 1, wherein the diallyl phthalate is diallyl terephthalate and/or diallyl isophthalate.
4. A plastic lens according to claim 1, which is used as an ophthalmic lens.